US005736084A

United States Patent [19]

Uchida et al.

[11] Patent Number: 5,736,084

[45] Date of Patent: Apr. 7, 1998

[54] APPARATUS FOR SUPPLYING PARTICLES AND/OR GRANULES TO FORM A LAYER OF PRESCRIBED THICKNESS AND METHOD FOR PRODUCING PATTERNED SHAPED ARITICLES USING THE APPARATUS

[75] Inventors: Hiroshi Uchida, Ashikaga; Mituhiro Onuki, Kiryu; Hideo Watanabe, Ashikaga, all of Japan

[73] Assignee: CCA Inc., Tokyo, Japan

[21] Appl. No.: 665,415

[22] Filed: Jun. 18, 1996

Related U.S. Application Data

[62] Division of Ser. No. 353,997, Dec. 6, 1994, Pat. No. 5,554,393, which is a continuation of Ser. No. 22,295, Feb. 25, 1993, abandoned.

[30] Foreign Application Priority Data

Feb. 26, 1992 [JP] Japan .................................... 4-73025

[51] Int. Cl.$^6$ .................................................. B29C 39/12

[52] U.S. Cl. ......................... 264/112; 264/113; 264/122; 264/245

[58] Field of Search .................................... 264/112, 122, 264/113, 109, 245

[56] References Cited

U.S. PATENT DOCUMENTS

| | | | |
|---|---|---|---|
| 1,929,301 | 10/1933 | Batcheller . | |
| 2,037,788 | 4/1936 | Hultberg . | |
| 2,037,822 | 4/1936 | Robert . | |
| 2,324,574 | 7/1943 | Gans . | |
| 2,962,381 | 11/1960 | Dobry et al. . | |
| 3,245,341 | 4/1966 | Childress et al. . | |
| 3,296,675 | 1/1967 | Filangeri . | |
| 3,477,108 | 11/1969 | Stokes . | |
| 3,727,801 | 4/1973 | Caridis et al. . | |
| 5,368,791 | 11/1994 | Uchida et al. | 264/35 |
| 5,429,676 | 7/1995 | Uchida et al. | 118/310 |
| 5,624,510 | 4/1997 | Uchida et al. | 156/62.2 |

*Primary Examiner*—Mary Lynn Theisen

*Attorney, Agent, or Firm*—Oblon, Spivak, McClelland, Maier & Neustadt, P.C.

[57] ABSTRACT

An apparatus for supplying particles and/or granules to form a layer of prescribed thickness onto a given surface includes endless pattern-forming device having a plurality of spaces, a device for supplying particles and/or granules into the spaces via a control member provided on the particle or granule-supplying device, a device for temporarily retaining the supplied particles and/or granules in the spaces, and a device for releasing the temporarily retained particles and/or granules onto the given surface. A patterned shaped article is produced by a method using the apparatus. The method includes supplying dry particles and/or granules for a pattern course into the spaces, temporarily retaining the supplied particles and/or granules in the spaces, releasing the temporarily retained particles and/or granules onto the given surface, and allowing the released particles and/or granules to set on the given surface.

8 Claims, 11 Drawing Sheets

APPARATUS FOR SUPPLYING PARTICLES AND/OR GRANULES TO FORM A LAYER OF PRESCRIBED THICKNESS AND METHOD FOR PRODUCING PATTERNED SHAPED ARITICLES USING THE APPARATUS

This is a Division of application Ser. No. 08/353,997 filed on Dec. 6, 1994, U.S. Pat. No. 5,554,393 which is a continuation of application Ser. No. 08/022,295, filed on Feb. 25, 1993, abandoned.

BACKGROUND OF THE INVENTION

1. Field of the Invention

The present invention relates to an apparatus for supplying particles and/or granules to form a layer of prescribed thickness and a method for producing patterned shaped articles using the apparatus. The patterned shaped articles that can be produced include concrete shaped articles, artificial stone shaped articles, raw products for ceramic shaped articles, ceramic shaped articles, crystalline glass shaped articles, enameled articles, cloisonne articles, plastic shaped articles and shaped foodstuffs.

2. Description of the Prior Art

The conventional method of providing part or all of a paved surface constituted of paving blocks with a pattern indicating, for example, a crosswalk, a stop intersection or other such traffic control mark has been either to apply paint to the surface in the desired pattern or to inlay the surface with another material in the desired pattern.

However, since the patterns painted on part or all of the surface of paving blocks are exposed to abrasion from pedestrians' shoes and/or vehicle tires and the like, they quickly wear off and have to be redone at frequent intervals, at a considerable cost in terms of labor and materials. Where the pattern is formed by inlaying, the work itself is troublesome and very costly.

The present invention has been accomplished to overcome the drawbacks encountered by the conventional method.

One object of the present invention is to provide an apparatus for supplying a particulate or granular layer of prescribed thickness onto a given surface.

Another object of the present invention is to provide a method for producing patterned shaped articles capable of maintaining their patterns in excellent condition even when exposed to surface abrasion, using the aforementioned apparatus.

SUMMARY OF THE INVENTION

To attain the objects described above, according to the present invention there is provided an apparatus for supplying particles and/or granules to form a layer of prescribed thickness onto a given surface, comprising endless pattern-forming means having a plurality of spaces, means for supplying particles and/or granules into the spaces via control means, means for temporarily retaining the supplied particles and/or granules in the spaces, and means for releasing the temporarily retained particles and/or granules onto the given surface.

According to the present invention, there is also provided a method for producing a patterned shaped article, which comprises using the aforementioned apparatus, charging dry pattern-course materials into the spaces of the endless pattern-forming means, and causing the charged materials to set into an integral mass as the patterned shaped article on a given surface.

The aforementioned and other objects, characteristic features and advantages of the present invention will become more apparent to those skilled in the art as the disclosure of the present invention is made hereinbelow with reference to the accompanying drawings.

DESCRIPTION OF THE PREFERRED EMBODIMENTS

The present invention will now be described in detail with reference to the illustrated embodiments.

FIGS. 1 to 4 illustrate the first embodiment of the apparatus for supplying particles and/or granules to form a layer 14 of prescribed thickness onto a given surface 11 or 10. It comprises endless pattern-forming means having a plurality of spaces, means for supplying particles and/or granules into the spaces via control means, means for temporarily retaining the supplied particles and/or granules in the spaces, and means for releasing the temporarily retained particles and/or granules onto the given surface.

Figure 1:
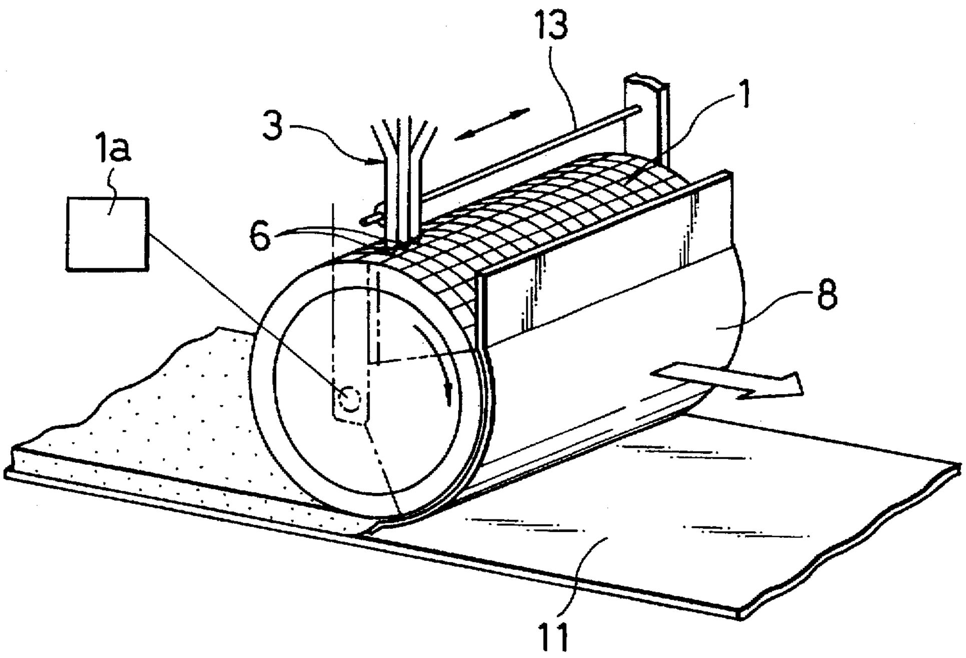
FIG. 1 is a schematic perspective view illustrating an example of the first embodiment of the apparatus according to this invention.

In the first example shown in FIG. 1, an endless cell form 1 is used as the endless pattern-forming means, and three feed pipes 3 are used as the particle- or granule-supplying means and provided each with a gate 6 serving as the control means. The cell form 1 has a plurality of cells having square openings and trapezoidal cross sections and is wrapped around a cylindrical drum. The drum is placed so as to roll on the given surface 11. The feed pipes 3 are disposed above the cell form 1 so as to be slidable in the direction of the axis of the drum (in the direction of the width of the cell form 1) in a reciprocative fashion along a guide 13 for charging particles and/or granules for forming base and pattern courses into the cells. As the drum rolls on the given surface 11, the charged particles or granules in the cells are temporarily retained therein by a retaining plate 8 and discharged onto the given surface 11 at the lower end of the retaining plate 8 to form a particulate or granular layer 14 on the given surface 11. Thus, a continuous layer 14 of prescribed thickness is formed on the given surface 11 with the rolling movement of the drum on the given surface 11. Means for driving the cell form 1, and drum is schematically illustrated in FIG. 1 by reference numeral 1*a*; means for driving the slidable feed pipes 3 and pipe gates 6, means for driving the apparatus as a whole, and a particle or granule vessel disposed at the proximal ends of the feed pipes have been omitted from FIG. 1 for reasons of explanatory convenience.

Figure 2:
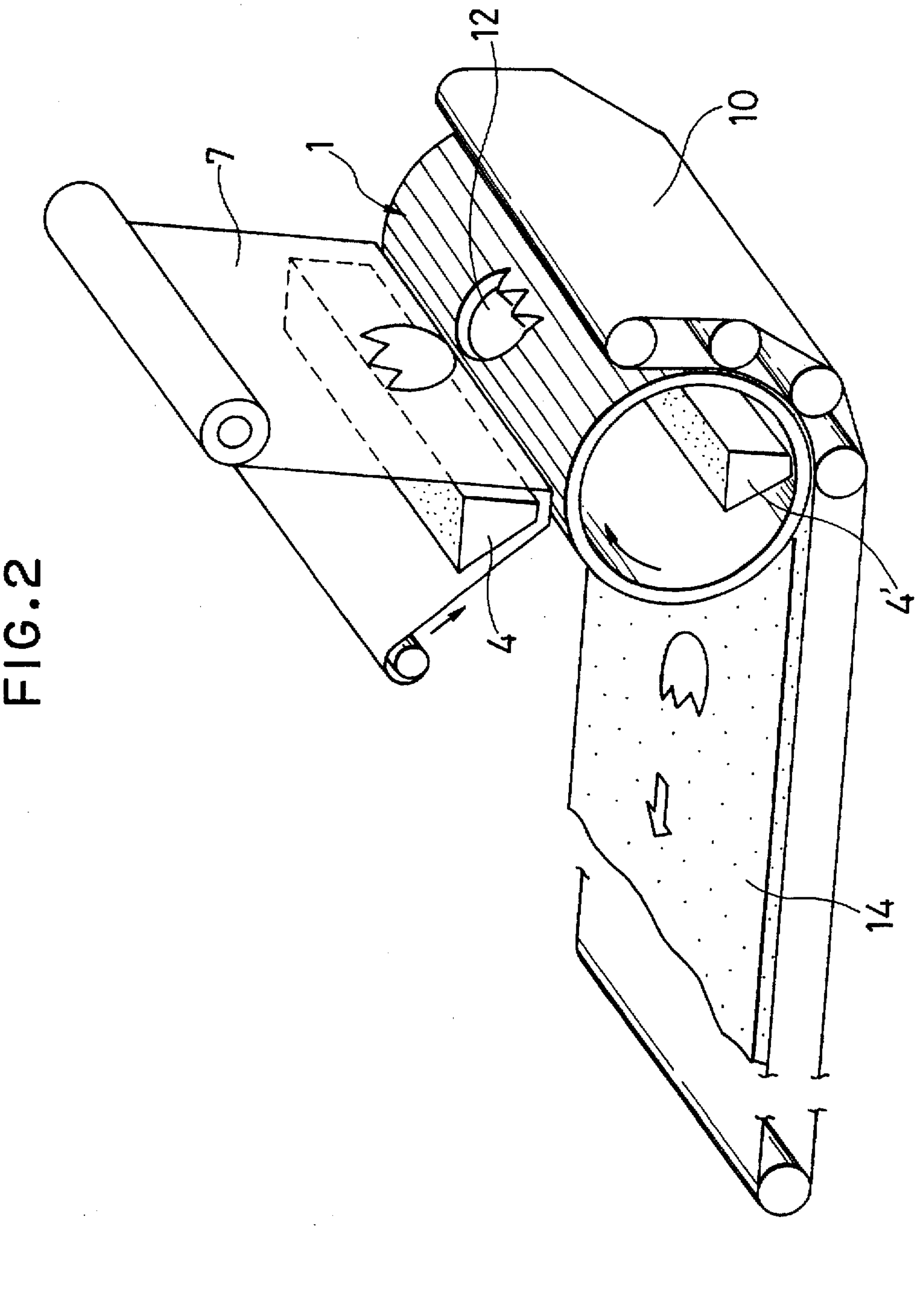
FIG. 2 is a schematic perspective view illustrating a second example of the first embodiment.

The second example shown in FIG. 2 comprises an endless cell form 1, a first particle- or granule-supplying vessel 4 and a second particle- or granule-supplying vessel 4'. The cell form 1 is wrapped around a cylindrical drum, similarly to the first example, provided with a plurality of cells each having a rectangular opening and a trapezoidal cross section and patterned with tulip-shaped through holes each having a frame 12 of the same shape snugly fitted therein. The drum is laid so as to roll on the given surface 10 like an endless belt having a portion serving as a retaining plate. The first particle- or granule-supplying vessel 4 has an effective length the same as the length of the drum, is provided above the drum and has a lower opening covered by a sheet mask 7 formed into a mesh having tulip-shaped closed portions formed at positions corresponding to the positions of the tulip-shaped through holes of the cell form 1 so as to permit the passage of particles and/or granules through the meshed portion other than the closed portions. The second particle or granule-supplying vessel 4' is disposed in contact with the inside of the drum at a position in the vicinity of the lower terminal end of the portion of the given surface 10 serving as the supporting plate. With this arrangement, the particles or granules in the first vessel 4 are charged into the cells of the cell form 1 other than the tulip-shaped through holes and those in the second vessel 4' are charged into the tulip-shaped through holes, and the charged particles or granules are discharged onto the given surface 10 which is conveyed in unison with the rotation of the drum to form a particulate or granular layer 14. Means for driving the cell form 1, drum, mask 7 and endless belt-like given surface 10, and means for feeding supplementary particles or granules into the first and second vessels 4 and 4' have been omitted from FIG. 2 for reasons of explanatory convenience.

Figure 3:
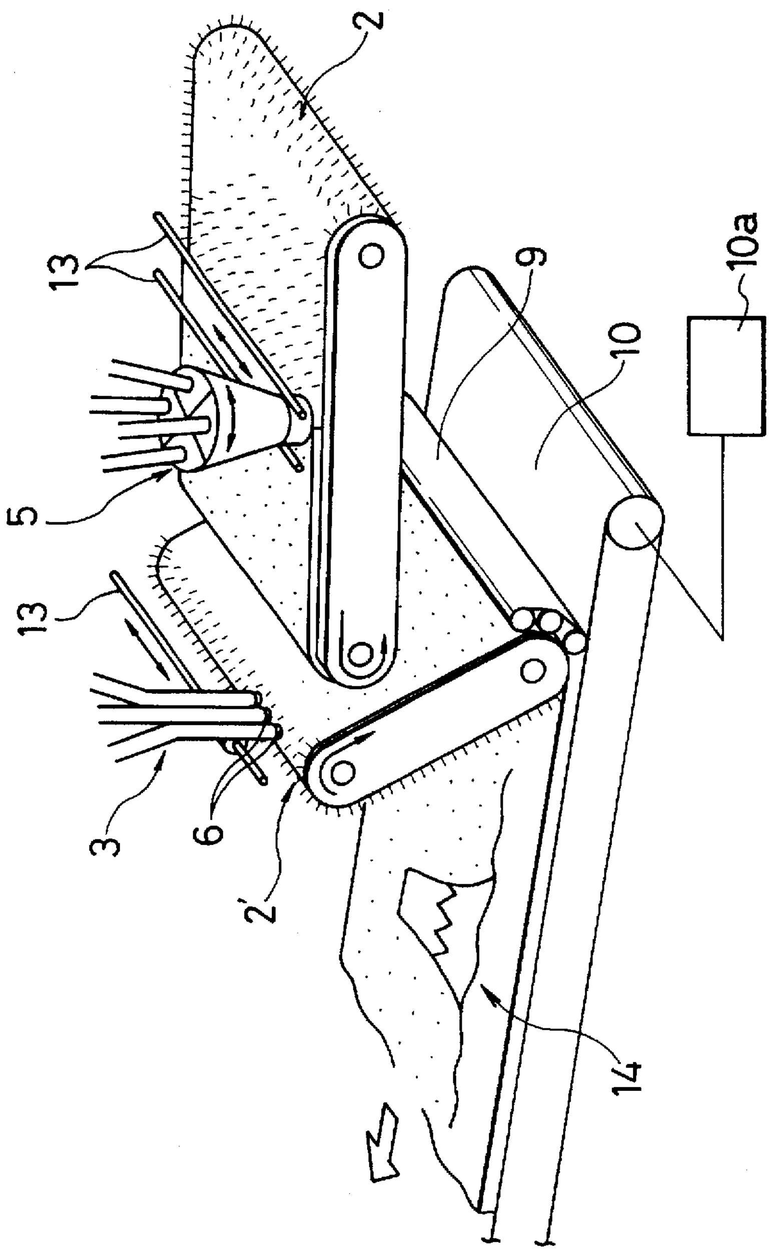
FIG. 3 is a schematic perspective view illustrating a third example of the first embodiment.

The third example shown in FIG. 3 comprises first and second belt-like endless forms 2 and 2' with bristling projections such as pins etc. (hereinafter referred to as the "bristling form"), a particle- or granule-supplying vessel 5 having a gate and three particle- or granule-supplying pipes 3 each having a gate 6. The vessel 5 is disposed above the first bristling form 2 so as to be rotatable in the clockwise and counterclockwise directions for positioning the gate and also to be slidable in the direction of the width of the first bristling form 2 in a reciprocative fashion along a guide 13 for charging four kinds of particles and/or granules into the bristling form 2. The three pipes 3 are disposed above the second bristling form 2' so as to be slidable in the direction of the width of the second bristling form 2' in a reciprocative fashion along another guide 13 for charging three kinds of particles or granules into the second bristling form 2'. The particles or granules charged into the first bristling form 2 are supplied into the second bristling form 2' by the rotation of the first bristling form 2 and combined with the particles or granules charged into the second bristling form 2'. All the particles or granules supplied into the second bristling form 2' are retained by a retaining sheet belt 9 provided on the given surface 10 like an endless belt to be movable in unison with the rotation of the second bristling form 2' and are then discharged onto the given surface 10 to form a particulate or granular layer 14 on the given surface 10. Means for driving the pipes 3, pipe gates 6, vessel 5, vessel gate, first and second bristling forms 2 and 2', and means for feeding fresh particles or granules into the vessel 5 have been omitted from FIG. 3 for reasons of explanatory convenience. Means for driving the surface 10 is schematically illustrated in FIG. 3 by reference numeral 10*a*.

Figure 4:
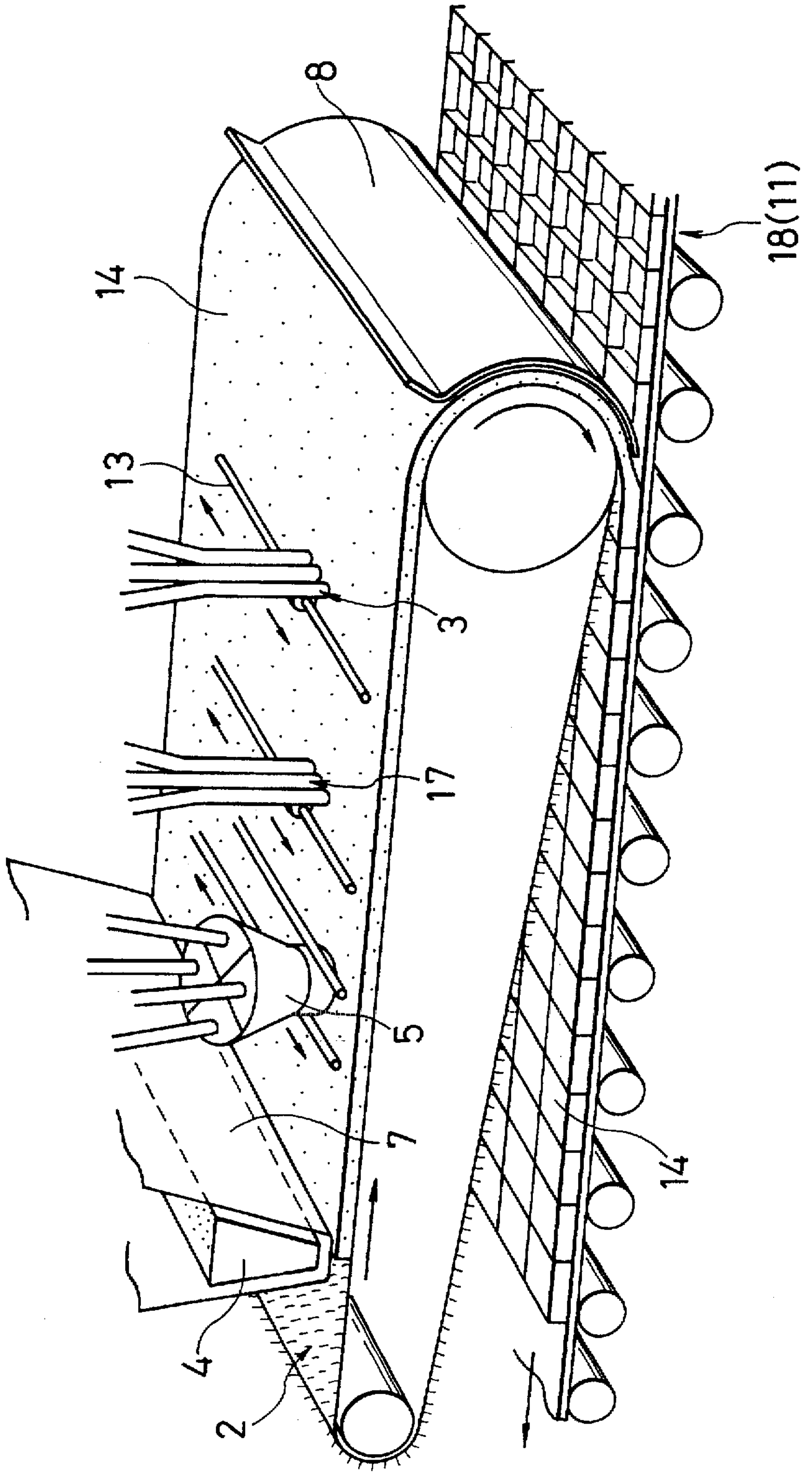
FIG. 4 is a schematic perspective view illustrating a fourth example of the first embodiment.

The fourth example shown in FIG. 4 comprises an endless bristling form 2, a first vessel 4 for supplying particles or granules into the bristling form 2 through a mask 7, a second vessel 5 having a gate, rotatable in the clockwise and counterclockwise directions and slidable in the direction of the width of the bristling form 2 in a reciprocative fashion along a guide to charge four kinds of particles and/or granules into the bristling form 2, suction pipes 17 slidable in the direction of the width of the bristling form 2 in a reciprocative fashion along a guide to suck up the particles or granules, and feed pipes 3 slidable in the direction of the width of the bristling form 2 in a reciprocative fashion along a guide 13 to charge particles or granules into the bristling form 2. The first and second vessels 4 and 5, suction pipes 17 and feed pipes 3 are successively disposed at prescribed intervals above the bristling form 2 in the direction in which the bristling form 2 advances. In the case where a complicated pattern is desired to be formed, the particles or granules supplied from the first and second vessels 4 and 5 into some parts of the bristling form 2 are positively sucked up by the suction pipes 17 and different particles or granules are supplied from the feed pipes 3 into the parts emptied by sucking. The suction pipes 17 can also be used advantageously when a defective portion is to be mended. The particles or granules charged into the bristling form 2 are retained by a retaining plate 8 and then discharged in the form of a particulate or granular layer 14 onto the given belt-like surface 11 on which a frame or setter 18 divided into a plurality of sections of a size equal to that of the finished product is laid. The given surface 11 is moved in unison with the rotation of the bristling form 2. Means for driving the slidable feed pipes 3, suction pipes 17, rotatable second vessel 5, vessel gate, mask 7, belt-like bristling form 2 and belt-like given surface 11, and means for supplying fresh particles or granules into the first vessel 4 have been omitted from FIG. 4 for reasons of explanatory convenience.

The first embodiment of the apparatus for supplying particles and/or granules to form a layer of prescribed thickness according to the present invention has been described with reference to the four illustrated examples. This embodiment is not limited to these examples, however, and may be modified by suitably combining the component parts of these examples. Further, the step of discharging the particles and/or granules from the cell form 1 or bristling form 2 onto the given surface 10 or 11 may be carried out either gradually or at one time.

FIGS. 5 to 8 illustrate the second embodiment of the apparatus for supplying particles and/or granules to form a layer 14 of prescribed thickness onto the given surface 10, 11 or 19. It comprises pattern-forming means having a uniform height or uniform width and opening in the direction of material flow and particle- or granule-supplying means.

Figure 5:
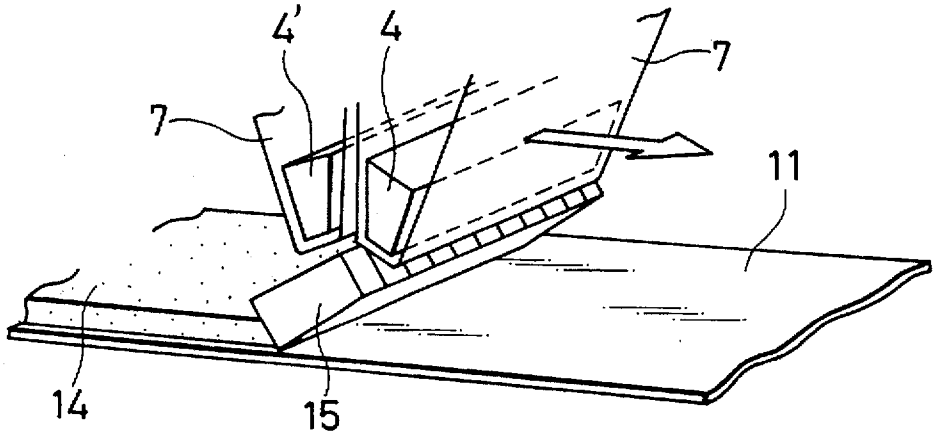
FIG. 5 is a schematic perspective view illustrating an example of the second embodiment of the apparatus according to the present invention.
Figure 6:
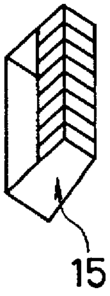
FIG. 6 is a perspective view illustrating pattern-forming means used in the second embodiment of FIG. 5.

In the first example of the second embodiment shown in FIGS. 5 and 6, a cell form 15 having a plurality of cells of a uniform height arranged continuously is used as the pattern-forming means, and two vessels 4 and 4' are used as the particle- or granule-supplying means. The cells of the cell form 15 each have a notch formed in an upper side portion thereof as shown in FIG. 6. The cell form 15 is placed on and across the given surface 11 and tilted at an angle of 45°. The vessels 4 and 4' are placed above the cell form 15 to permit particles and/or granules to pass through sheet masks 7 having given patterns into the cells. The particles or granules thus supplied into the cells are discharged onto the given surface 11 in the form of a particulate or granular layer 14 of prescribed thickness from a lower opening of the cell form 15. In this example, the apparatus as a whole is moved rightward in FIG. 5 to form a continuous particulate or granular layer 14 on the given surface 11. Means for driving the masks 7, means for moving the apparatus as a whole and means for introducing fresh particles or granules into the vessels 7 have been omitted from FIG. 5 for reasons of explanatory convenience. The angle between the cell form 15 and the given surface 11 is not limited to 45° and may be suitably selected in view of the shape of the cell form 15 and the properties and conditions of the particles or granules. In addition, the given surface 11 may be caused to move leftward in FIG. 5 while the apparatus is kept stationary.

Figure 7:
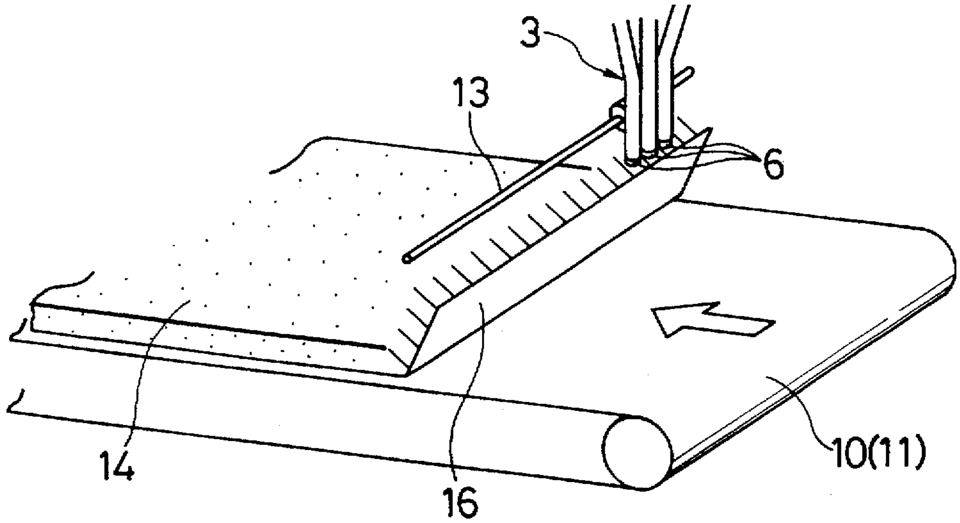
FIG. 7 is a schematic perspective view illustrating a second example of the second embodiment.

The second example of the second embodiment illustrated in FIG. 7 comprises a bristling form 16 having a uniform width, placed on and across the belt-like given surface 10 and tilted at an angle of 60°, and three pipes 3 each having a gate 6 and provided above the bristling form 16 so as to be slidable in the direction of the length of the bristling form 16 in a reciprocative fashion along a guide 13 for charging three kinds of particles and/or granules into the bristling form 16 through the pipe gates 6. The particles or granules charged into the bristling form 16 are passed through the pins or the like projections of the bristling form 16 and discharged onto the given surface 10 in the form of a particulate or granular layer 14 having a given thickness. In this example, the given surface 10 is moved leftward in FIG. 7. Means for driving the pipe gates 6 and belt-like given surface 10 and means for introducing supplemental particles or granules into the pipes 3 have been omitted from FIG. 7 for reasons of explanatory convenience. The angle between the bristling form 16 and the given surface 10 is not limited to 60° and may be suitably selected in view of the shape of the bristling form 16 and the features and conditions of the particles or granules. In addition, the apparatus as a whole may be caused to move rightward in FIG. 7 while the given surface 10 is kept stationary.

Figure 8:
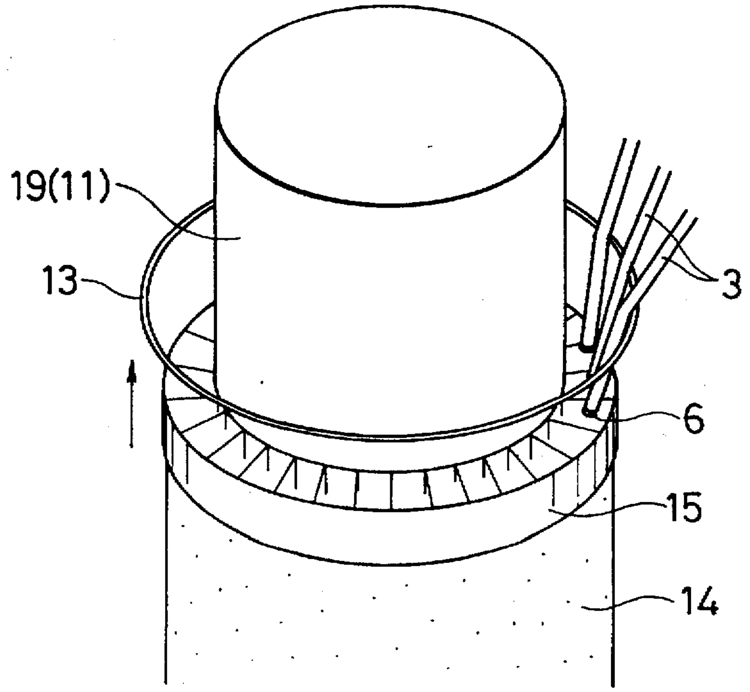
FIG. 8 is a schematic perspective view illustrating a third example of the second embodiment.

The third example of the second embodiment illustrated in FIG. 8 comprises a cylindrical ring-like cell form 15 having a plurality of cells of a uniform height arranged continuously in the circumferential direction thereof and three pipes 3 each having a gate 6 and provided above the cell form 15 so as to be slidable in the circumferential direction of the cell form 15 along a guide 13 for charging three kinds of particles and/or granules into the cell form 15. The cell form 15 is movably fitted on the cylindrical given surface 19 and has lower openings arranged at right angles relative to the given surface 19. The particles or granules supplied from the pipes 3 through the pipe gates 6 into the cells of the cell form 15 are discharged from the lower openings of the cell form 15 onto the given surface 19. The cell form 15 is moved on the given surface 19 to form a continuous particulate or granular layer 14 on the given surface 19. Means for driving the pipe gates 6, means for moving the apparatus as a whole and means for introducing fresh particles or granules into the pipes 3 have been omitted from FIG. 8 for reasons of explanatory convenience. The angle between the openings of the cell form 15 and the given surface is not limited to 90° and may suitably be selected in view of the shape of the cell form 15 and the features and conditions of the particles or granules.

The second embodiment of the apparatus for supplying particles and/or granules to form a layer of prescribed thickness according to the present invention has been described with reference to the three illustrated examples. This embodiment is not limited to these examples, however, and may be modified by suitably combining the component parts of these examples.

FIGS. 9 to 12 illustrate examples of the pattern-forming means. The pattern-forming means is made of metal, plastic, rubber, wood, paper, non-woven fabric, knit fabric or the like.

Figure 9:
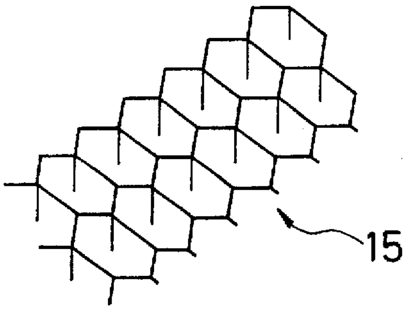
FIG. 9 is a partially cutaway enlarged perspective view illustrating a second example of the pattern-forming means.
Figure 10:
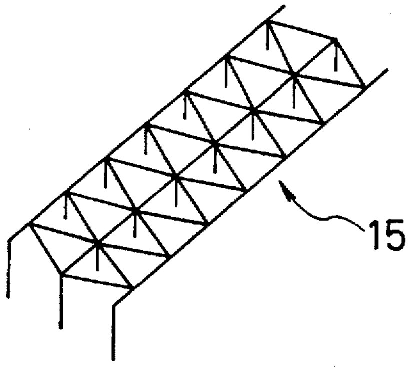
FIG. 10 is a partially cutaway enlarged perspective view illustrating a third example of the pattern-forming means.
Figure 11:
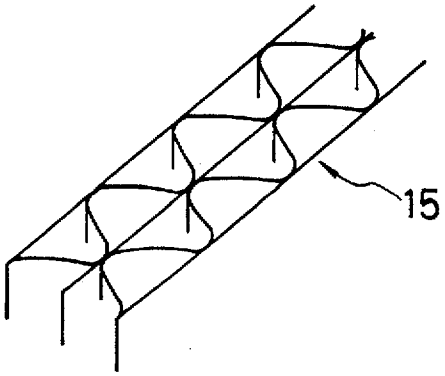
FIG. 11 is a partially cutaway enlarged perspective view illustrating a fourth example of the pattern-forming means.
Figure 12:
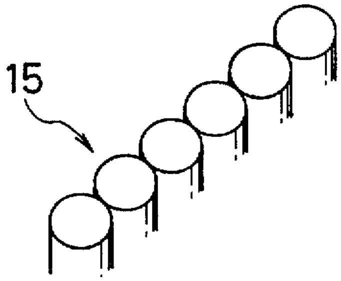
FIG. 12 is a partially cutaway enlarged perspective view illustrating a fifth example of the pattern-forming means.
Figure 13:
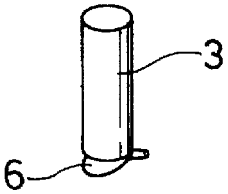
FIG. 13 is a perspective view illustrating an example of the particle- or granule-supplying means used in the present invention.
Figure 14:
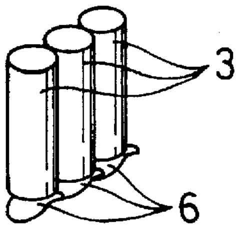
FIG. 14 is a perspective view illustrating another example of the particle- or granule-supplying means.
Figure 15:
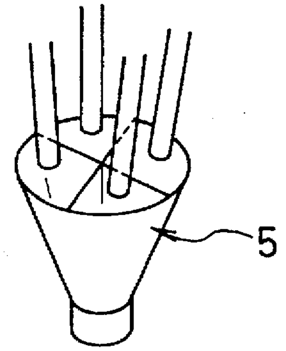
FIG. 15 is a perspective view illustrating still another example of the particle- or granule-supplying means.
Figure 16:
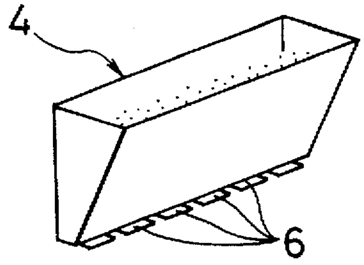
FIG. 16 is a perspective view illustrating yet another example of the particle- or granule-supplying means.
Figure 17:
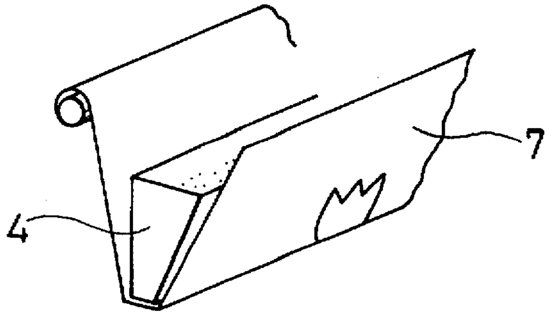
FIG. 17 is a perspective view illustrating a further example of the particle- or granule-supplying means.

The means shown in FIG. 9 is a cell form 15 having a plurality of cells of a hexagonal or honeycomb configuration. FIG. 10 shows another example of the means having a plurality of cells of a triangular configuration. The means shown in FIG. 11 is a cell form 15 having a plurality of cells similar to those of corrugated cardboard. FIG. 12 shows a further example of the means which is a cell form 15 having a plurality of cylindrical cells. The shape of the cells is not limited to the shapes of these examples and may be floral or stellate or may be any other shape. When particles or granules are supplied from the outside into the endless cell form, the cell form is required to keep its outside open for retaining the particles or granules and its inside closed. When particles or granules are supplied from the inside of the endless cell form, as shown in FIG. 2, the cell form is required to keep its outside and inside open at the positions of the through holes in which the frames 12 are snugly fitted. In place of the cylindrical endless cell forms shown in FIGS. 1 and 2, a belt-like cell form may be used. In this case, it is desirable for the cell form to be formed with cuts or to have the cells connected one by one at their respective lower ends so as to make the cell form deformable easily as a whole. When the particles or granules are discharged from the cell form onto the given surface, it is advantageous to provide a material flow promoting plate curved in the direction of the material flow or a material flow regulating plate having a plurality of projections rising from the material flow promoting plate like a comb. The cell form shown in FIGS. 5 and 6 keeps its upper and lower sides open and has a row of cells. However, it may have a plurality of rows of cells. The cell form is desirably set aslant so that the particles or granules can readily flow onto the given surface. Otherwise, the cell form may be bent in the direction of the material flow or provided with a material flow promoting plate bent in the direction of the material flow. The length of the sides of the cells is determined to be in the range of about 1 to about 50 mm, depending on the pattern to be formed. The height of the cells is determined in accordance with the desired thickness of the layer of particles or granules to be formed and the flow state of the granules or particles. The cell form may either be made endless by uniting the opposite ends thereof together or be removably disposed above a drum etc. in a curved fashion and may have a joint portion. Where the cell form has a joint portion, the positions of corresponding portions of a pattern to be formed are made coincident with each other and, when a shaped article is formed on a plate or sheet, the length of the plate or sheet is made equal to the length of the outer circumference of the drum and supply of materials starts at the joint portion.

The endless bristling form 2 or bristling form 16 of a given width comprises a support member and a plurality of projections rising from the support member. The support member is a sheet of metal, plastic, rubber, wood paper, knit fabric, woven fabric or unwoven fabric and includes a netted sheet of the same material. For easy illustration, the projections standing upright from the support member are shown in the form of thin pins. Instead, however, they may be in any of various other forms such as sticks, pipes, pieces, standing fibers or filaments (which can be of the implanted, raised or attached type), or pipe or loops formed by knitting or weaving. The projections desirably have high density and, in the case of the bristling form 16 of a given width, the projections are desirably coarser and firmer than those of the endless bristling form in view of the function of regulating the flow of particles and/or granules. In the case of the endless bristling form 2, it is advantageous to provide a material flow promoting plate curved in the direction of the material flow or a material flow regulating plate having a plurality of projections rising from the material promoting plate like a comb in order to properly discharge particles or granules onto the given surface. The bristling form 16 of a given width is desirably arranged aslant so as to promote flowing of the particles or granules onto the given surface. The inclination of the projections of the bristling form 16 of a given width is determined in accordance with the flow state of the particles or granules, and an auxiliary rod or plate is provided substantially in parallel to the support member or directly on the bristling form so that the flow of the particles or granules can be controlled. A material promoting plate bent in the direction of material flow may be provided below the bristling form 16 of a given width. Otherwise, the support member or projections of the bristling form 16 may be bent in the direction of material flow. The projections of the bristling form 2 or 16 are made of metal, plastic, rubber, wood, paper, unwoven fabric, woven fabric, knit fabric or the like. In the case of the projections in the form of thin pins, fibers or filaments, the diameter thereof is desired to be in the range of about 50 μm to about 10 mm. In the case of the projections in the form of pieces, the width thereof is desired to be in the range of about 1 mm to 50 mm and the thickness thereof in the range of about 50 μm to about 5 mm. In the case of pipe-shaped projections, the diameter thereof is desirably in the range of about 1 mm to 20 mm. The length of the projections is determined in accordance with the desired thickness of the layer of particles or granules to be formed and the flow state of the particles or granules. The bristle form may either be made endless by uniting the opposite ends thereof together or be removably disposed above a drum, belt, etc. and may have a joint portion. Where the bristle form has a joint portion, the positions of corresponding portions of a pattern to be formed are made coincident with each other and, when a shaped article is formed on a plate or sheet, the length of the plate or sheet is made equal to the length of the outer circumference of the drum or the length of the belt and supply of materials starts at the joint portion.

A particle or granule vessel disposed at the proximal ends of the feed pipes etc. has been omitted from FIGS. 1 to 8 for reasons of explanatory convenience. Although means for supplying materials from the particle or granule vessel to the feed pipes etc. is not shown, pipe conveyers, screw conveyers, chain conveyers can be used, and the materials may be conveyed under pressure or by utilizing compressed air or into a chute.

FIGS. 13 to 17 illustrate means for supplying particles and/or granules into the spaces defined by cells of a cell form or projections of a bristling form. The means shown in FIG. 13 comprises a pipe 3 and a gate 6, that shown in FIG. 14 comprises a plurality of pipes 3 and their gates 6, that shown in FIG. 15 comprises a particle- or granule-supplying vessel 5 having a gate and divided into a plurality of rooms, and a plurality of pipes directed to the rooms, respectively, and is of a type that is rotated for switching the supply of particles or granules, that shown in FIG. 16 comprises a vessel 4 and a plurality of gates arranged on the lower portion of the vessel, and that shown in FIG. 17 comprises a vessel 4 and a sheet mask 7 partially surrounding the vessel 4. The particle or granule supplying means may have any other arrangement. For example, the particles or granules may be supplied into the cells or between the bristle form projections by disposing a mask below a vessel using a squeegee and scraping the particles or granules from the openings of the mask with the squeegee. The gates may be positioned at the lowermost portion of a pipe or at a position slightly higher than the lowermost portion. Usable gates include slidable gates, pipe-pinching gates, valve-like gates and gates of various other types. Examples of the gates include those shown in FIG. 16 and a slit gate disposed to extend over the entire width of the vessel. The slit gate can advantageously be used when a ground design is to be formed. The mask 7 is in the form of a plate or sheet and may be used in combination with either the endless cell form 1 as shown in FIG. 2 or the endless bristling form 2 as shown in FIG. 4.

The apparatus with an endless cell or bristling form for supplying particles and/or granules to form a layer of prescribed thickness can also serve as a printer applicable to thick printing by adopting a combination like a rotary press, thereby enabling various patterns to be formed not only on a sheet-like shaped article but also on a block-like shaped article. There may be further provided a scraper for scraping the particles or granules supplied to form a pattern course, and suction pipes 17 as illustrated in FIG. 4, suction slits for sucking up the supplied particles or granules through a mask or slits with a gate for the purpose of mending a defective portion or forming a complicated pattern such as red leaves floating on concentric water ripples by supplying supplemental particles or granules into the sucked out portions.

In the case of the apparatus with a cell form of a given height or bristling form of a given width having an opening directed in the direction of material flow for supplying particles and/or granules to form a layer of a given thickness, the given surface may be flat as illustrated in FIGS. 5 and 7 or cylindrical as illustrated in FIG. 8, or may be prismatic or arcuate. Also in this apparatus, there may be further provided a scraper for scraping the particles or granules supplied to form a pattern course, and suction pipes, suction slits for sucking the supplied particles or granules in through a mask or slits with a gate for the purpose of mending a defective portion or forming a complicated pattern by supplying supplemental particles or granules into the sucked portion.

In any of the apparatuses, as occasion demands, there may be further provided vibrators, anti-electrostatic devices, auxiliary rods or plates, or other auxiliary devices or implements in order to control the material flow.

FIGS. 18 to 22 illustrate patterned shaped articles produced by the method of the present invention. The article shown in FIG. 18 comprises a pattern course 20 having a flower pattern 21 shown on the obverse and reverse surfaces thereof. That shown in FIG. 19 comprises the pattern course 20 of FIG. 18 and a back layer 26 made of the same material as the flower pattern 21 of FIG. 18. That shown in FIG. 20 comprises the pattern course 20 of FIG. 18 and another pattern course 23 having a leaf pattern 22, thus forming different patterns on the obverse and reverse surfaces thereof. That shown in FIG. 21 comprises a back layer 26 and a pattern course divided into a plurality of blocks representing a scenery pattern as a whole. That shown in FIG. 22 comprises a plurality of stacked pattern courses which in cross section form a grain pattern resembling natural stone. It goes without saying that any number of other patterns can also be formed. The aforementioned patterned shaped articles will be described more specifically.

Figure 18:
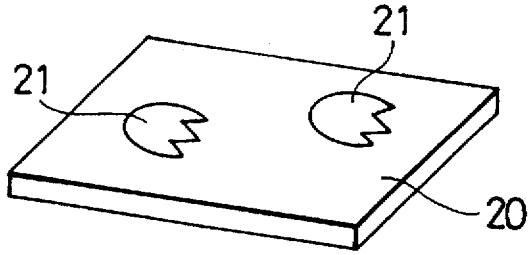
FIG. 18 is a perspective view illustrating a first example of the patterned shaped article produced by this invention.

In FIG. 18, a patterned shaped article having a white layer 20 and a red layer 21 representing tulips is produced by using any one of the apparatuses shown in FIGS. 1 to 7 to supply particles and/or granules onto the given surface and temporarily or permanently shaping the supplied particles or granules on the given surface. The kind of the particles or granules used determines whether the shaping method should adopt addition of water, solvent, oil, lubricant, bonding agent or setting agent to the particles or granules and whether it should utilize the steps of applying pressure, heating or sintering. The given surface may be the surface of a stationary plate or belt conveyor, or the bottom surface of a frame or setter. The patterned shaped article may be formed to have a size the same as or larger than the size of the finished article. In the case of a large-sized patterned shaped article, it may be cut to have a size the same as that of the finished article. Further, the apparatus may be positioned above a plurality of frames or setters each having a size the same as that of the finished article, and particles or granules can be discharged from the apparatus onto the bottoms of the frames or setters.

Figure 19:
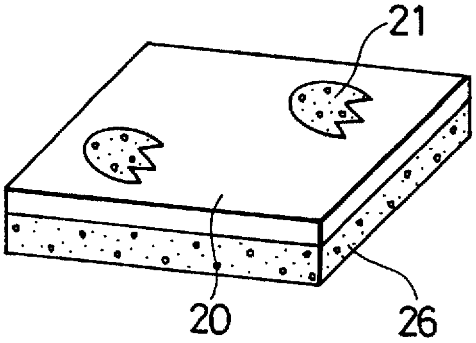
FIG. 19 is a perspective view illustrating a second example of the patterned shaped article produced by this invention.

The patterned shaped article shown in FIG. 19 is a combination of a back layer 26 and the article of FIG. 18 superposed on the back layer and is produced by any one of the apparatuses shown in FIGS. 1 to 7. The back layer can be made of a material the same as or different from the material of the article of FIG. 18 insofar as the two can be made integral with each other. The back layer may be formed in advance on the surface of a stationary plate or conveyor which is the given surface and the article of FIG. 18 may be formed as superposed on the formed back layer. The patterned shaped article of FIG. 19 can be produced by supplying respective particles and/or granules onto the given surface and temporarily or permanently shaping the supplied particles or granules on the given surface. The kind of the particles or granules used determines whether the shaping method should adopt addition of water, solvent, oil, lubricant, bonding agent or setting agent to the particles or granules and whether it should utilize the steps of applying pressure, heating or sintering. The given surface may be the surface of a stationary plate or belt conveyor, or the bottom surface of a frame or setter. The patterned shaped article may be formed to have a size the same as or larger than the size of the finished article. In the case of a large-sized patterned shaped article, it may be cut to have a size the same as that of the finished article. Further, the apparatus may be positioned above a plurality of frames or setters each having a size the same as that of the finished article, and particles or granules can be discharged from the apparatus onto the bottoms of the frames or setters. When the apparatus of FIG. 3 or FIG. 4 having a plurality of particle- or granule-supplying vessels or pipes is used, both the back layer and the patterned layer can be produced. In FIG. 3, for example, the back layer can be formed using either the rotatable vessel 5 disposed above the first bristling form 2 for supplying four kinds of particles or granules or the pipes 3 disposed above the second bristling form 2' for supplying three kinds of particles or granules. In the case of FIG. 4, the back layer can be formed using either the vessel 4 with a mask or the rotatable vessel 5. However, when it is necessary to use the suction pipes 17 and feed pipes 3 for mending, the vessel 4 with a mask can be advantageously used to form a back layer.

Figure 20:
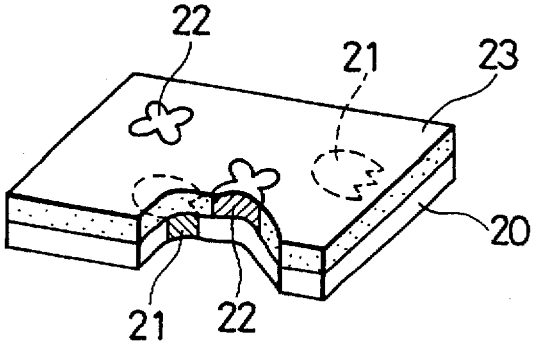
FIG. 20 is a perspective view illustrating a third example of the patterned shaped article produced by this invention.

The patterned shaped article shown in FIG. 20 comprises a white reverse layer 20 having red flower patterns 21 and a blue obverse layer 23 having green leaf patterns 22 and is produced using an apparatus of FIG. 3 or FIG. 4 having a plurality of particle- or granule-supplying vessels or pipes. When the apparatus of FIG. 3 is used, for example, the rotatable vessel 5 disposed above the first bristling form 2 for supplying four kinds of particles and/or granules and the feed pipes 3 disposed above the second bristling form 2' for supplying three kinds of particles or granules are used independently, one for the formation of the obverse layer and the other for the formation of the reverse layer. In the case of FIG. 4, a combination of the vessel 4 having a mask with the rotatable vessel 4 is used for the formation of either one of the obverse and reverse layers and the feed pipes 3 is used for the formation of the other layer. The patterned shaped article of FIG. 20 can be produced by supplying respective particles or granules onto the given surface and temporarily or permanently shaping the supplied particles or granules on the given surface. The kind of the particles or granules used determines whether the shaping method should adopt addition of water, solvent, oil, lubricant, bonding agent or setting agent to the particles or granules and whether it should utilize the steps of applying pressure, heating or sintering. The given surface may be the surface of a stationary plate or belt conveyor, or the bottom surface of a frame or setter. The patterned shaped article may be formed to have a size the same as or larger than the size of the finished article. In the case of a large-sized patterned shaped article, it may be cut to have a size the same as that of the finished article. Further, the apparatus may be positioned above a plurality of frames or setters each having a size the same as that of the finished article, and particles or granules can be discharged from the apparatus onto the bottoms of the frames or setters.

Figure 21:
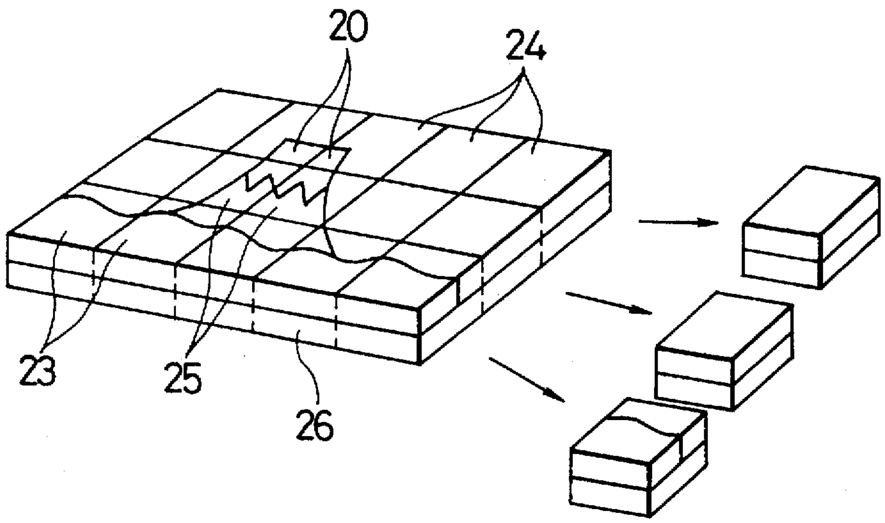
FIG. 21 is a perspective view illustrating a fourth example of the patterned shaped article produced by this invention.

The patterned shaped article shown in FIG. 21 comprises a pattern layer showing a scene and a back layer 26 and is divided into a plurality of small blocks. This article can be produced by using the apparatus capable of supplying four or more kinds of particles and/or granules as shown in FIG. 3 or FIG. 4, supplying material 23 suitable for representing the sea, material 24 suitable for representing the sky, material 20 suitable for representing the snow covered peak of a mountain and material 25 suitable for representing the side of the mountain to form the pattern layer, forming the back layer in the same manner as used for producing the patterned shaped article shown in FIG. 19 or FIG. 20, making the two layers integral with each other, and cutting the integral mass into a plurality of small blocks. Otherwise, a back layer is formed in advance on the surface of a conveyor, a pattern layer is formed as superposed on the back layer, and the two layers are made integral with each other and cut into a plurality of small blocks. The two layers may be made integral by arranging a plurality of frames or setters each having a size the same as that of small blocks and forming the two layers on the bottoms of the frames or setters using the apparatus shown in FIG. 3 or FIG. 4, or by supplying material for the back layer onto the bottoms of the frames or setters and then supplying material for the pattern layer onto the back layer and vice versa.

Figure 22:
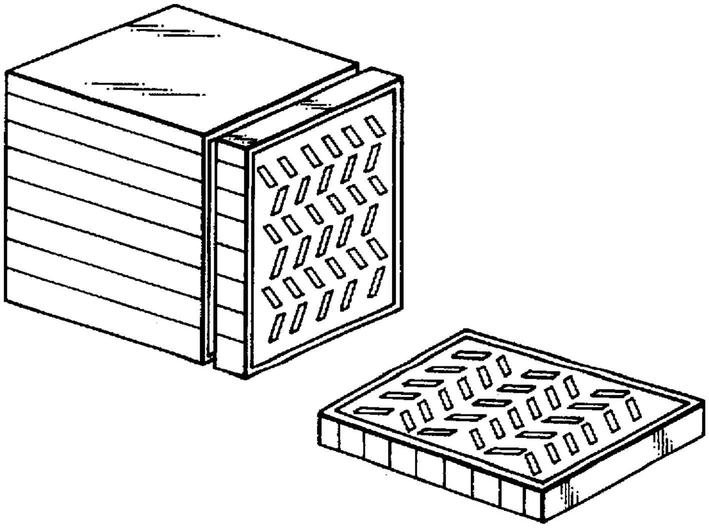
FIG. 22 s a perspective view illustrating a fifth example of the patterned shaped article produced by this invention.

The patterned shaped article shown in FIG. 22 has a grain pattern resembling natural stone and is produced by preparing a plurality of pattern layers and stacking the pattern layers while shaking them in the direction normal to the stacking direction at constant amplitude and cutting the stacked layers in the accumulation direction into a plurality of slices. By this shaking, a complicated pattern including inclined components shown in FIG. 22 can be obtained.

In the method of the present invention, dry material is used for forming a pattern layer. Although the material may have absorbed some moisture after drying, it is not kneaded with water, oil, lubricant-bonding agent, solvent, setting agent or plasticizer and is in a state readily amenable to pulverization before charging. On the other hand, the material of which the back layer is formed may be either dry or wet with one or more of water, oil, lubricant-bonding agent, solvent, setting agent and plasticizer. Otherwise, a plate of metal, wood, cement, glass or ceramic or a sheet of paper, unwoven fabric, woven fabric, knit fabric or plastic may be used as the back layer. In this case, the plate or sheet serves as the given surface. Any other existing shaped article may be used as the given surface.

The materials 20, 21, 22, 23, 24, 25 and 26 may differ from one another depending on the shaped article to be produced. Otherwise, in the finished state they are required to differ from one another in color, luster, texture and the like.

In producing a concrete shaped article, the pattern-course material is dry and is cement powder, resin or a mixture thereof and may additionally include at least one of a pigment and fine aggregates. The material for the back layer is dry and is cement powder, resin or a mixture thereof and may additionally include at least one of a pigment and fine aggregates similarly to the pattern-course material. However, the back layer material can be in the form of a concrete slurry obtained by kneading with water.

Both the materials 20, 21, 22, 23, 24 and 25 for the pattern layer and the material 26 for the back layer may additionally include wood chips as aggregates or fine aggregates and may further include as blended therewith crushed or pulverized granite, crushed or pulverized marble, slag, minute light-reflecting particles, inorganic hollow bodies such as Shirasu balloons, particles or granules of ceramics, new ceramics, metal, ore or other such substances. They may also contain as additives a congealing and curing promoter, a waterproofing agent, an inflating agent and the like. The aforementioned various kinds of usable fibers include metal fibers, carbon fibers, synthetic fibers, glass fibers and the like.

All the materials are charged into a frame or the like and are allowed to set into an integral mass. Otherwise, after the material charging, water is supplied in a suitable amount to all portions of the interior of the frame, thereby setting the materials into an integral mass within the frame. If a wet material is used for the back layer, the amount of water supplied is reduced in view of the water contained in the wet material. When a plate of metal, wood, cement, glass or ceramic or a sheet of paper, unwoven fabric, woven fabric or knit fabric is used as the back layer, for example, it is set integral with the pattern layer. An asphaltic concrete shaped article can be produced using a thermal fusion material such as asphalt etc.

In producing an artificial stone shaped article, the materials 20, 21, 22, 23, 24 and 25 for the pattern layer and the material 26 for the back layer may, for example, be constituted of one or more of rock particles, rock granules, ceramic particles, ceramic granules, new ceramic particles, new ceramic granules, glass particles, glass granules, plastic particles, plastic granules, wood chips, metal particles or metal granules and may, as found necessary, further have mixed therewith a pigment and a setting agent for bonding the mixture. The setting agent is a mixture of cement powder and water, a mixture of cement powder, resin and water, or a mixture of resin, water and a solvent and may further contain particles or granules of one or more of rock, ceramic, new ceramic, glass and plastic and may, as found necessary, be kneaded with a pigment or colorant and have mixed therewith various kinds of powders and granules, various kinds of fibers, various kinds of mixing agents and various kinds of additives. The various kinds of powders and granules include powders and granules of slag, fly ash, and fine light-reflecting substances. The various kinds of fibers include metal fibers, carbon fibers, synthetic fibers and glass fibers. The various kinds of mixing agents and additives include shrink proofing agents, congealing and setting agents, delaying agents, waterproofing agents, inflating agents, water reducing agents, fluidizing agents and the like.

If necessary for enhancing the adherence of the setting material with the aforementioned mixture, the mixture can be sprayed with or immersed in water, solvent or surface treatment agent.

All the materials can be set into an integral mass within a frame by a vacuum-suction on other such treatment for spreading the setting agent between adjacent particles or granules or by using a mixture of aggregates and a setting agent as the material 26 for the backing layer. When a board of metal, wood, cement, glass or ceramic or a sheet of paper, unwoven fabric, knit fabric, woven fabric or plastic is used as the back layer, the pattern layer is attached as superposed on the back layer.

For producing a ceramic shaped article or the raw product for a ceramic shaped article, the dry materials 20, 21, 22, 23, 24 and 25 for the pattern layer are particles or granules of one or more of clay, rock, glass, new ceramic, fine ceramic and glaze with or without a pigment or colorant added thereto. The materials may be ones which have absorbed some water or been added with a lubricant-bonding agent after drying but they are not kneaded with the lubricant-bonding agent or water and are in a state readily amenable to pulverization. The material 26 for the back layer is constituted of particles or granules of one or more of clay, rock, glass, new ceramic and fine ceramic and may additionally contain a pigment and a colorant. In the finished state, the back layer is required to differ from the pattern layer in color, luster, texture and the like and may be either dry, similarly to the pattern layer, or made wet by kneading with water or a lubricant-bonding agent. In addition, either the materials for the pattern layer or the material for the back layer may have further mixed therewith inorganic hollow bodies such as Shirasu balloons, and particles or granules of ceramic, metal or ore and may have added thereto various kinds of foaming agents, fluidization-preventing agents, supernatant agents, lubricating agents, bonding agents and adherence promoters as additives.

The materials supplied into a frame are allowed or caused to set into an integral mass without adding on by adding a predetermined amount of water or lubricant-bonding agent to plasticize them and applying pressure to the resultant mixture. The set integral mass is removed from the frame and used as a raw product. The raw product is sintered to obtain a ceramic shaped article. Otherwise, the materials supplied into a refractory setter or the like frame are melted or fused by heating to obtain an integral mass, and the integral mass is removed from the setter. In the case of a shaped article of enamel, stained glass or crystalline glass the material for the pattern form is laid on a plate of metal, glass, ceramic, etc. and melted or fused by heating to be made integral with the plate.

The dry materials 20, 21, 22, 23, 24 and 25 for the pattern layer used in producing a shaped article having a thick paint layer are various kinds of powdered paint, and the material 26 for the back layer is a plate or the like of metal, wood, cement or ceramic. The various kinds of powdered paint include acrylic resin, polyester resin, acrylic-polyester hybrid resin, fluorine resin and similar resins having a pigment or colorant added thereto. The materials for the pattern layer are laid on the plate as a back layer and melted and fused by heating to unite the two layers together. In uniting the two layers together, pressure may be applied to the layers. As a result, it is possible to obtain a plate having a thick paint layer thereon.

In producing a plastic shaped article, the dry materials 20, 21, 22, 23, 24 and 25 for the pattern layer are constituted of particles or granules of various kinds of plastics and may additionally contain a pigment or colorant. The materials may also contain a plasticizer or solvent, but are not kneaded with a plasticizer or solvent and are in a state readily amenable to pulverization. The material 26 for the back layer may be either dry or made wet by kneading with a plasticizer or solvent. The various kinds of plastics include polyethylene, nylon, polypropylene, polycarbonate, acetal, polystyrene, epoxy, vinyl chloride, natural rubber, synthetic rubber, acrylonitrile-butadiene-styrene, polypropylene oxide, ethylene-vinyl acetate copolymer, fluorine resin and other thermoplastic and thermosetting resins. Both the materials for the pattern layer and the material for the back layer may, as found necessary, contain a foaming agent, oxidization preventing agent, thermal stabilizer, bridging agent and other additives. All the materials are melted or fused into an integral mass by heating, while applying pressure thereto, if necessary. With this method, it is possible to produce a patterned shaped article of foamed styrol, patterned shaped bathtub or floor tile of plastic, etc. In this case, the two layers may be united with a plate of metal, wood, cement, ceramic or a sheet of paper, unwoven fabric, knit fabric, woven fabric or plastic.

In producing confectionery or other shaped foodstuffs, the dry materials 20, 21, 22, 23, 24 and 25 for the pattern layer are constituted of particles or granules of one or more of wheat, rice, potato, bean, corn and sugar and may additionally contain seasonings and spices. The materials may also contain oil or water, but are not kneaded with oil or water and are in a state readily amenable to pulverization. The material 26 for the back layer may be either dry similarly to the materials for the pattern layer or made wet by kneading with oil or water. Both the materials for the pattern layer and the material for the back layer may, as found necessary, further contain an inflating agent and other additives. All the materials supplied into a frame are allowed to set or caused to set by adding a prescribed water or oil to plasticize them into an integral mass. The integral mass is pressed and then removed from the frame to obtain a raw product. The raw product is then baked. Otherwise, all the materials are baked within the frame. With this method, it is possible to produce patterned baked confectionery. It is also possible to produce a patterned shaped article melted by heating, such as a patterned chocolate shaped article etc. by using particles or granules of the material melted by heating, such as chocolate etc. and melting and fusing the particles or granules by heating.

In the method for producing any of the patterned shaped articles, it is desirable to apply vibration when the materials are supplied onto the given surface so as to ensure smooth movement of the materials. Further, by rubbing with a brush or comb or applying a jet of air or water to the portion of the boundary between the different kinds of materials for the pattern layer, the pattern can be blurred.

In addition, by providing on the given surface or pattern layer a mat of unwoven fabric or other water or oil absorbing material, any excess amount of water, oil, lubricant-bonding agent, plasticizer or solvent can be absorbed and the absorbed amount of water, oil, lubricant-bonding agent, plasticizer or solvent can be supplied to any portion deficient in them to uniformly disperse them in the shaped article. As a result, the ratio of the water (auxiliary agents) in the surface to the cement (resins) becomes small and this means that the strength of the shaped article as a whole is enhanced. When an air permeable mat is used in the formation of an article under pressure, deaeration is enhanced to obtain a dense article. By vibrating or pressing one or both of the pattern layer and the back layer when the two layers are allowed to set into an integral article, the integral article obtained becomes dense and is improved in strength. The article may be reinforced with long fibers, short fibers, wire nets or reinforcing rods by inserting these in or between the two layers. The method using an article obtained by the sheet making method or extrusion molding method, any plate or any sheet as the back layer is applicable to the production of various articles including architectural panels and boards, wall sheets and tiles. The surface of an existing concrete article can be used as the given surface. In this case, the materials for the pattern layer are discharged onto the concrete surface and set to be integral with the existing concrete article.

The finished surface of a shaped article to be obtained can be curved if a deformable mat or a partially or entirely deformable frame is used.

As has been described in the foregoing, according to the present invention there can be provided not only an apparatus simple in construction for supplying particles and/or granules to form a layer of prescribed thickness but also an apparatus having a plurality of components combined with each other like a rotary press to serve also as a printer for deep paint and as means for producing a concrete block or the like. Therefore, it is possible to form various patterns on any one of various sheets including wallpaper, various plates and large blocks and continuously produce not only small articles but also large articles with ease. In addition, according to the method of the present invention using the aforementioned apparatus, it is possible to easily produce concrete shaped articles, artificial stone shaped articles, raw products sintered into ceramic shaped articles, ceramic shaped articles, crystalline glass shaped articles, enameled articles, cloisonne articles, deeply painted shaped articles, plastic shaped articles and shaped foodstuffs including confectionery each having a pattern of a prescribed thickness formed on the part or all of the surface thereof. Therefore, the patterned shaped articles can maintain their patterns in excellent condition even when exposed to surface abrasion. Since the pattern layer is formed by a combination of various kinds of dry materials, the materials can be densely charged without any gap owing to their cave-in action and the boundaries between adjacent materials can be minutely expressed. The pattern formed is thus very clear-cut. In addition, it is also possible to positively disturb the charged materials either at the boundaries between them or as a whole after the materials have been charged. Doing this enables the production of shaped articles which resemble marble or other kinds of natural stone. In the case of the production of either a raw product for a ceramic shaped article or a ceramic shaped article, it is possible to produce various kinds of elements, circuits, antennas, etc. with ease by combining at least two kinds of materials for an insulator, conductor, semiconductor, dielectric, piezoelectric device, magnetic substance, etc. Furthermore, when the produced article is used as an architectural plate, since the plate maintains its pattern even after chamfering, cutting treatment can be effected without any restriction.

What is claimed is:

1. A method of forming a patterned shaped article on a given surface, the method comprising the steps of:

using a particle-supplying means to supply plural kinds of particles into a plurality of spaces defined by cells densely arranged in an endless cell form so that the supplied particles can express a prescribed pattern;

temporarily retaining the supplied particles in said spaces;

releasing the temporarily retained particles onto the given surface with the prescribed pattern kept expressed while moving one of the given surface and the cell form having the supplied particles retained temporarily in said spaces; and causing the released particles to set into an integral mass.

2. A method according to claim 1, wherein the released particles are caused to set to be integral with a back layer.

3. A method of forming a patterned shaped article on a given surface, the method comprising the steps of:

using particle-supplying means to supply plural kinds of particles into a plurality of spaces defined by projections densely bristling on an endless bristling form so that the supplied particles can express a prescribed pattern;

temporarily retaining the supplied particles in said spaces;

releasing the temporarily retained particles onto the given surface with the prescribed pattern kept expressed while moving one of the given surface and the bristling form having the supplied particles retained temporarily in said spaces; and causing the released particles to set into an integral mass.

4. A method according to claim 3, wherein the released particles are caused to set to be integral with a back layer.

5. A method of forming a patterned shaped article on a given surface, the method comprising the steps of:

using particle-supplying means to supply plural kinds of particles into a plurality of cells of constant height consecutively arranged in a cell form and opening in a direction of flow of the particles so that the supplied particles can express a prescribed pattern;

disposing the cell form above the given surface;

releasing the supplied particles onto the given surface so that the supplied particles have a prescribed thickness, with the prescribed pattern kept expressed, while moving the given surface in the flow direction or the cell form in a direction opposite to the flow direction; and causing the released particles to set into an integral mass.

6. A method according to claim 5, wherein the released particles are caused to set to be integral with a back layer.

7. A method of forming a patterned shaped article on a given surface, the method comprising the steps of:

using particle-supplying means to supply plural kinds of particles into gaps between a plurality of projections densely bristling on a bristling form of constant width and opening in a direction of flow of the particles so that the supplied particles can express a prescribed pattern;

disposing the bristling form above the given surface;

releasing the supplied particles onto the given surface so that the supplied particles have a prescribed thickness, with the prescribed pattern kept expressed, while moving the given surface in the flow direction or the bristling form in a direction opposite to the flow direction; and causing the released particles to set into an integral mass.

8. A method according to claim 7, wherein the released particles are caused to set to be integral with a back layer.

* * * * *